US008867130B1

(12) United States Patent
Harrison et al.

(10) Patent No.: US 8,867,130 B1
(45) Date of Patent: Oct. 21, 2014

(54) POLARIZATION DEVICE FOR VACUUM ULTRAVIOLET OR SHORTER WAVELENGTHS

(75) Inventors: Dale A. Harrison, Austin, TX (US); Anthony T. Hayes, Leander, TX (US)

(73) Assignee: VUV Analytics, INc., Austin, TX (US)

( * ) Notice: Subject to any disclaimer, the term of this patent is extended or adjusted under 35 U.S.C. 154(b) by 396 days.

(21) Appl. No.: 13/184,601

(22) Filed: Jul. 18, 2011

Related U.S. Application Data

(60) Provisional application No. 61/400,153, filed on Jul. 22, 2010.

(51) Int. Cl.
*G02B 5/30* (2006.01)
*G02B 27/28* (2006.01)

(52) U.S. Cl.
USPC .................................. 359/485.01

(58) Field of Classification Search
CPC ............... G02B 13/143; G02B 27/145; G02B 17/0892; G02B 27/144; G02B 5/208; G02B 21/16; G02B 27/1006; G02B 27/283; G02B 19/0095; G02B 5/28; G02B 5/3091
USPC .......................... 359/485, 583, 495, 355, 638
See application file for complete search history.

(56) References Cited

U.S. PATENT DOCUMENTS

| 4,132,653 | A | 1/1979 | Samson |
| 4,577,122 | A | 3/1986 | Kung |
| 5,864,427 | A | 1/1999 | Fukano et al. |
| 6,480,330 | B1 * | 11/2002 | McClay et al. ............. 359/359 |
| 6,834,069 | B1 | 12/2004 | Bergmann et al. |
| 7,067,818 | B2 | 6/2006 | Harrison |
| 7,095,497 | B2 | 8/2006 | Kishikawa et al. |
| 7,391,030 | B2 | 6/2008 | Harrison |
| 7,485,869 | B2 | 2/2009 | Harrison et al. |
| 7,574,601 | B2 | 8/2009 | Jahromi et al. |
| 7,684,037 | B2 | 3/2010 | Harrison et al. |
| 2006/0203251 | A1 * | 9/2006 | Millerd et al. ............. 356/495 |
| 2008/0204710 | A1 * | 8/2008 | Harrison et al. ............. 356/51 |

FOREIGN PATENT DOCUMENTS

EP    1406110 A1    4/2004

OTHER PUBLICATIONS

Horton et al., "A Triple Reflection Polarizer for Use in the Vacuum Ultraviolet", Applied Optics, vol. 8, No. 3, Mar. 1969, 4 pgs.
Morris et al., "Single Rochon Prisms for Light Polarization Between 1400-70,000 A", Applied Optics, vol. 8, No. 6, Jun. 1969, 2 pgs.

(Continued)

*Primary Examiner* — William Choi
*Assistant Examiner* — Sharrief Broome
(74) *Attorney, Agent, or Firm* — Egan, Peterman & Enders LLP.

(57) ABSTRACT

A highly efficient polarization device for use in the VUV or shorter wavelength is provided. The polarization device may include a dispersive element capable of splitting an incident un-polarized beam of light into two beams of orthogonal linear polarization through introduction of an angular deviation. The polarization device may also include a focusing element capable of focusing at least a portion of one of the linearly polarized beams to a small region. Said polarization device may also incorporate a spatial aperture through which most of one of the beam passes, but through which most of the other does not.

20 Claims, 7 Drawing Sheets

(56) References Cited

OTHER PUBLICATIONS

Chandrasekharan et al., "Birefringent Lens Polarizer for the Vacuum Ultraviolet", Applied Optics, vol. 10, No. 3, Mar. 1971, 2 pgs.

Walker, "Pile of Plates Polarizer for the Vacuum Ultraviolet", Applied Optics, vol. 3, No. 12, Dec. 1964, 4 pgs.

Yang et al., "Tunable Thin Film Polarizer for the Vacuum Ultraviolet and Soft X-ray Spectral Regions", Journal of Applied Physics, 2007, 4 pgs.

Remneva et al., "Polarizer of Radiation in the Vacuum Ultraviolet (60-200 nm)", Zhurnal Prikladnoi Spektroskopii, vol. 25, No. 6, 1975, 4 pgs.

Johnson, "Magnesium Fluoride Polarizing Prism for the Vacuum Ultraviolet", Department of Chemistry, University of Washington, 1964, 2 pgs.

Robin et al., "Micaceious Biotite As Efficient Brewster Angle Polarizer for Vacuum Ultraviolet", The Review of Scientific Instruments, vol. 37, No. 7, 1966, 3 pgs.

* cited by examiner

POLARIZATION DEVICE FOR VACUUM ULTRAVIOLET OR SHORTER WAVELENGTHS

This application claims priority to U.S. Provisional Patent Application No. 61/400,153 filed Jul. 22, 2010; the disclosure of which is expressly incorporated herein by reference.

BACKGROUND OF THE INVENTION

The present disclosure relates to the field of polarization spectroscopy. More specifically, it provides a means by which vacuum ultraviolet (VUV) or shorter wavelength of light may be polarized in a highly efficient manner. In one embodiment the techniques disclosed can be used to linearly polarize broad band VUV light in such a means as to afford maximum optical throughput. As used herein VUV light includes, generally, wavelengths of light that are about 190 nm and less wavelengths.

A polarizer is a device that converts a beam of electromagnetic radiation with undefined or mixed polarization into a beam with well-defined polarization. Polarizers are employed in a wide variety of optical instruments covering a diverse range of applications. Polarizers can be divided into two general categories: absorptive, where the unwanted polarization states are absorbed by the device, and beam-splitting, where the un-polarized light is split into two beams with differing polarization states.

Perhaps the simplest absorptive polarizer is the wire grid polarizer, consisting of a fine array of narrow metal lines oriented in a plane perpendicular to the incident beam. Electromagnetic waves which have a component of their electric fields aligned parallel to the wires induce the movement of electrons along the length of the wires. Since the electrons are free to move, the polarizer behaves in a similar manner as the surface of a metal when reflecting light; some energy is absorbed by the wires, resulting in Joule heating, while the rest is reflected backwards along the incident beam. For waves with electric fields perpendicular to the wires, the electrons cannot move very far across the width of each wire; therefore, little energy is absorbed or reflected, and the incident wave is able to travel through the grid. Since electric field components parallel to the wires are absorbed or reflected, the transmitted wave has an electric field purely in the direction perpendicular to the wires, and is thus linearly polarized.

In practice, the separation distance between the wires must be substantially less than the wavelength of the incident radiation, and in turn, the wire width should be a small fraction of this distance. Consequently, wire-grid polarizers are generally only used in conjunction with longer wavelength radiation (i.e. at microwave, far- and mid-infrared wavelengths). To a lesser degree, wire-grid polarizers capable of operating at visible wavelengths can be realized using very tight pitch metallic grids created via advanced lithographic techniques. Unfortunately, further extension of this approach to yet shorter wavelengths in the vacuum ultraviolet (VUV) regime is simply not practical as a result of the very small dimensions required.

Certain types of materials, like some crystals, are known to absorb more light in one incident plane than another. This anisotropy in absorption, called dichroism, can also be employed to control polarization. Generally speaking, this effect is wavelength dependent and by definition results in significant losses if a high degree of polarization is sought. As a result, dichroic crystals are not frequently employed in polarizer applications.

Beam splitting polarizers typically divide un-polarized incident light into two beams of differing polarization through use of reflection or refraction. Reflection-based polarizers exploit the fact that when light reflects at an angle from an interface between two transparent materials, the reflectivity is different for light polarized in the plane of incidence and light polarized perpendicular to it. Hence, simple polarizers can be constructed by tilting a stack of transparent plates at an angle relative to an incident beam. However, to achieve even moderate polarization in this manner it is necessary to incorporate many such plates, or to greatly increase the angle of the plates relative to the incident beam. In either case the intensity of the resultant polarized beam is typically quite low.

Refractive polarizers exploit the birefringent properties of crystals to separate un-polarized incident light into beams with differing polarizations. These devices usually consist of two prisms judiciously cut and arranged such that the ordinary and extraordinary rays are split into orthogonal linear polarization states. The prisms are typically cemented together or separated by a small air gap.

There are a wide variety of such devices, each tailored for use in a specific wavelength region or application. The most prevalent design for operation in the VUV is that of the Rochon polarizer. This device typically consists of two prisms of single crystal magnesium fluoride ($MgF_2$) which are optically contacted such that the ordinary beam passes through the prism unhindered; while the extraordinary beam exits the element at a small angle. These devices are manufactured by a select number of vendors including the Karl Lambrecht Corporation of Chicago, USA and Bernhard Halle Nachfolger GmbH of Germany.

Rochon polarizers capable of operating in the VUV are manufactured almost exclusively from $MgF_2$ as a result of its relatively high transmittance at short wavelengths. In spite of this favorable characteristic the performance of such devices is far from optimum, owing to the material's low birefringence. Unfortunately materials like quartz, which are considerably more birefringent than $MgF_2$, simply do not transmit at these wavelengths. Consequently, $MgF_2$ Rochon polarizers must employ large cut angles in order to produce sufficient separation between the ordinary and extraordinary beams. As a result, polarizers with disproportionately large length to clear aperture ratios are required, significantly limiting optical throughput at short wavelengths.

In view of these shortcomings, there would be great benefit in the development of a highly efficient VUV polarizer. Such a device would be capable of effectively separating un-polarized or randomly-polarized light into beams with orthogonal polarization states such that at least one of the beams may be fully utilized. The techniques disclosed herein would maximize optical throughput by minimizing the optical path length traversed by the light while inside the refractive materials.

SUMMARY OF THE INVENTION

The disclosure herein relates to the field of optical spectroscopy. In one embodiment, a highly efficient polarization device for use in the VUV or shorter wavelength is provided. The polarization device may include a dispersive element capable of splitting an incident un-polarized beam of light into two beams of orthogonal linear polarization through introduction of an angular deviation. The polarization device may also include a focusing element capable of focusing at least a portion of one of the linearly polarized beams to a small region. Said polarization device may also incorporate a spatial aperture through which most of one of the beam passes, but through which most of the other does not.

In another embodiment, a VUV or shorter wavelength polarization device capable of accepting an un-polarized input beam and rendering at least one linearly polarized output beam spatially separate and distinct from its orthogonal counterpart, while maintaining high optical throughput is described. Said polarization device may include a dispersive element capable of introducing an angular deviation between the beams of orthogonal linear polarization. Said dispersive element may be configured so as to minimize absorption losses in the transmitted beams, thereby increasing optical throughput and maximizing efficiency.

In yet another embodiment, a VUV or shorter wavelength polarization device capable of accepting un-polarized light and rendering at least one linearly polarized beam spatially separate and distinct from its orthogonal counterpart, while maintaining high optical throughput is described. The polarization device may include an enclosed volume, the enclosed volume configured to fully surround the elements comprising the polarization device. The enclosed volume further configured so as to reduce absorption losses in the transmitted beams, thereby increasing optical throughput and maximizing efficiency.

In yet another embodiment, a VUV or shorter wavelength polarization device capable of accepting un-polarized light and rendering at least one linearly polarized beam spatially separate and distinct from its orthogonal counterpart, while maintaining high optical throughput is described. The polarization device further configured so as to minimize the distance required to achieve separation of the polarized beams.

In yet another embodiment, a highly efficient VUV or shorter wavelength polarizer is provided. The polarizer may include a dispersive element capable of introducing an angular deviation between beams of orthogonal linear polarization. The polarizer may also include a focusing element capable of focusing at least one of the linearly polarized beams to a small region. Said polarizer may also include a spatial aperture through which most of one of the beams passes, but through which most of the other does not. The polarization device may be further configured so as to facilitate rotation of the plane of polarization of the output beam without movement of the spatial aperture or focusing element.

In yet another embodiment, a highly efficient VUV or shorter wavelength polarizing spectrometer is described. The spectrometer may include an entrance aperture which serves the joint purpose of restricting the spatial extent of light entering the spectrometer and permitting most of one the polarized beams to pass, while preventing the passage of most of the other.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the invention and are therefore not to be considered limiting of its scope, for the invention may admit to other equally effective embodiments.

DESCRIPTION OF THE PREFERRED EMBODIMENTS

Figure 1:
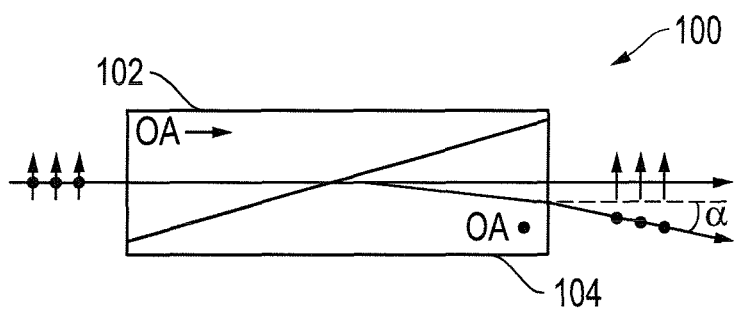
FIG. 1—(Prior Art)—Schematic representation of a Rochon polarizer.

A prior art VUV Rochon polarizer 100 is presented in FIG. 1. This device is comprised of two prisms of single crystal magnesium fluoride ($MgF_2$). The prisms are cut at a large angle (~80 degrees) and are optically contacted. The first prism 102 (depicted on the left hand side) is cut with its optical axis aligned perpendicular to its entrance face, while the second prism 104 (shown on the right hand side) is cut with its optical axis aligned parallel to its exit face. An incoming un-polarized ray at normal incidence to the entrance face of the first prism travels through the prism in a direction parallel to its optical axis. Upon reaching the interface, the ordinary portion of the beam passes through the second prism undeviated, while the extraordinary portion experiences a slightly larger refractive index and hence, undergoes a small angular deviation, ultimately exiting the polarizer at angle $\alpha$ as shown in FIG. 1.

The Rochon polarizer of FIG. 1 can also be employed in the reverse geometry (i.e. such that light travels through it from right to left) with essentially the same outcome; the ordinary beam exits the polarizer undeviated, while the extraordinary beam undergoes a small, albeit slightly larger, deviation than in the original configuration.

While reasonably transparent in the VUV, $MgF_2$ is only mildly birefringent. Consequently, $MgF_2$ Rochon polarizers must employ large cut angles if they are to introduce even small deviations between the exiting beams. Commercially available versions are typically cut at ~80° and range from 30 to 60 mm in length, depending on the clear aperture provided. In spite of this large cut angle, the deviation imparted upon the extraordinary beam is typically just a few degrees. Consequently, the polarized beams must travel significant distances (typically 200 mm to 350 mm) beyond the prism pair before they are spatially resolved. This constraint makes practical integration of the device into optical systems challenging and requires the use of significant volumes and/or numerous fold mirrors; both of which may be considered problematic in the VUV.

The considerable length of a typical $MgF_2$ Rochon polarizer (an unavoidable consequence of its large cut angle) severely limits its performance in the VUV. Despite its transparency in this region, relative to other materials, absorption losses in MgF$_2$ are considerable at short wavelengths. Hence, the efficiency of MgF$_2$ Rochon polarizers falls off quite dramatically at wavelengths below about 160 nm. A further consequence of the geometry of these devices is the clear aperture restrictions imposed by the large cut angle. That is, it is not possible to increase the clear aperture of the polarizer without also appreciably increasing its overall length. This in turn has the undesirable consequence of further reducing optical throughput at the shortest wavelengths.

Yet another drawback of the typical Rochon polarizer relates to its stability under exposure to high-power radiation. As VUV-transparent optical cements are generally not available, the prisms in a Rochon polarizer designed for VUV operation are typically joined via optical contacting. This procedure involves sufficiently polishing the faces of the prisms (typically to $\lambda/20$ or better) and bringing them into contact. Unfortunately, exposure to high-power radiation has been known to cause delamination of surfaces joined in this manner.

As a result, some vendors do offer custom Rochon polarizers specifically designed for use with high power UV lasers. The prisms in these polarizers are separated by a small air gap, rather than being optical contacted. To avoid total internal reflection of the incident beam at the prism/air interface, the prism cut angles are significantly decreased. Consequently, the already small angular separation between the output beams is even further reduced. Thus, while useful in conjunction with highly collimated lasers, these custom polarizers are simply not practical in applications involving less collimated polychromatic sources.

Hence while operable in the VUV, MgF$_2$ Rochon polarizers suffer from numerous shortcomings which limit their usefulness. These shortcomings include, but are not limited to; clear aperture restrictions, poor efficiency (i.e. low optical throughput) at short wavelengths, large space requirements, and radiation damage concerns.

Figure 2:
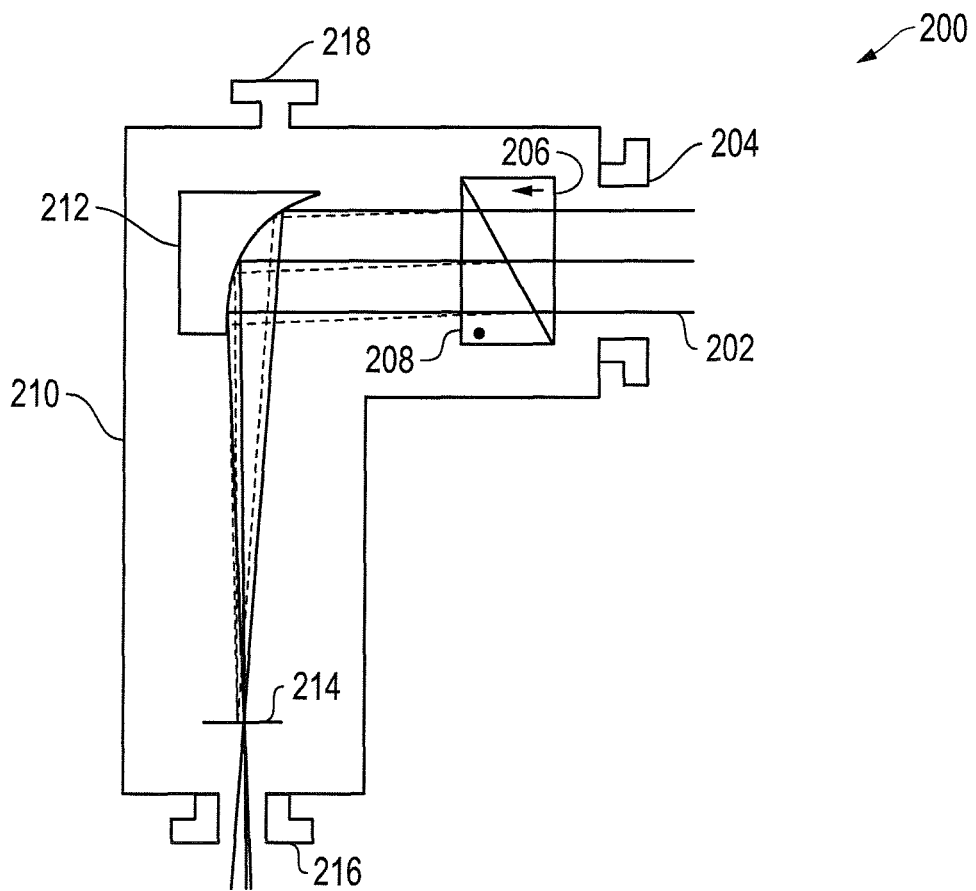
FIG. 2—Schematic representation of novel VUV polarization device.

A schematic representation of a novel polarizer 200 which overcomes this host of problems is presented in FIG. 2. This exemplary embodiment combines a pair of MgF$_2$ prisms cut at significantly smaller angles (~30 degrees) than those used in the conventional Rochon design. The prisms may either be optically contacted or separated by a small air gap, depending on the power levels expected. The first prism 206 (depicted on the right hand side) is cut with its optical axis aligned perpendicular to its entrance face, while the second prism 208 (shown on the left hand side) is cut with its optical axis aligned parallel to its exit face. The prisms are housed in a leak-tight enclosure 210 along with a focusing optic 212 and spatial aperture 214. The enclosure is equipped with input and output ports 204 and 216, as well as a gas manifold 218 to facilitate the environmental conditioning necessary to sustain VUV operation.

Environmental conditioning is typically achieved through the use of some combination of vacuum, purge, or backfill methodologies to reduce and/or remove the concentration of absorbing species (like oxygen and moisture) so as to support transmission of VUV wavelengths. In situations where purge or backfill techniques are utilized, high-purity non-absorbing (at least over the wavelength region of interest) gases like nitrogen, argon or helium may be employed.

In operation, collimated un-polarized light 202 enters through the input port 204 of the polarizer and is normally incident upon the entrance face of the prism pair. The input beam travels through the first prism 206 in a direction parallel to its optical axis. Upon reaching the interface, the ordinary portion of the beam (solid line) passes through the second prism 208 without deviation, while the extraordinary portion of the beam (broken line) undergoes a slight angular deviation. The orthogonally polarized beams depart the prism pair through the exit face and are directed by the focusing optic 212 onto the plane of the spatial aperture 214. The spatial aperture is configured such that most (or even all) of the ordinary beam passes through, while most (or even all) of the extraordinary beam is blocked.

Figure 3:
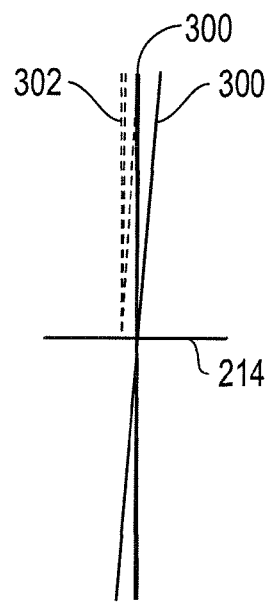
FIG. 3—Expanded view of novel VUV polarization device showing spatial separation of orthogonally polarized beams.

An expanded view of the spatial aperture is presented in FIG. 3. As is evident, the ordinary beam 300 (solid line) passes cleanly through the aperture, while the extraordinary beam 302 (broken line) is blocked. In general, the separation distance between the orthogonally polarized beams varies as a function of wavelength and depends in part on the optical properties of the prism pair. In one preferred embodiment of the current invention this would correspond to a separation distance of approximately 300 μm when input light of 150 nm is employed.

The use of the focusing optic and spatial aperture significantly reduces the distance that must be traversed by the polarized beams in order to achieve spatial separation. Generally speaking this distance can vary from as much as 200 mm down to as little as 35 mm, depending on the properties of the focusing optic employed.

Figure 4:
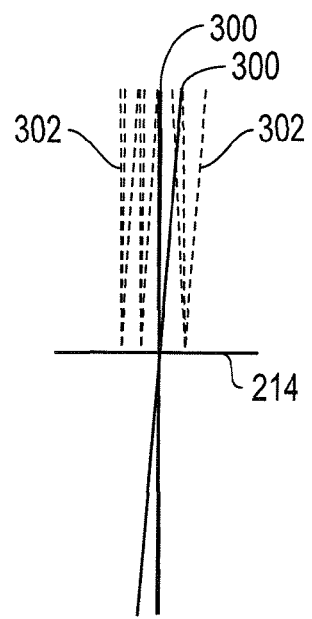
FIG. 4—Expanded view of novel VUV polarization device showing spatial separation when multiple wavelengths are employed.

When polychromatic input light is considered the situation is somewhat more complicated, as illustrated in FIG. 4. The ordinary beam enters and exits the prisms at normal incidence to the faces of the pair; hence, rays of differing wavelength remain collinear. In contrast, the extraordinary beam exits the prism pair at non-normal incidence, resulting in dispersion of the differing wavelength components. Consequently, the focusing optic brings all wavelength components of the ordinary beam 300 to focus at a single well-defined spot (centered over the opening of the aperture), while bringing the differing wavelength components of the extraordinary beam 302 to focus at a less well-defined region elsewhere on the aperture. In this manner the ordinary polarized beam 300, comprised of a range of wavelengths, passes through the opening in the spatial aperture, while the extraordinary polarized beam 302 is essentially blocked for all but a discrete range of wavelengths. It is noted that the shape of the less well-defined region, associated with the extraordinary beam, depends to a large extent on the specific focusing optic employed.

Figure 5:
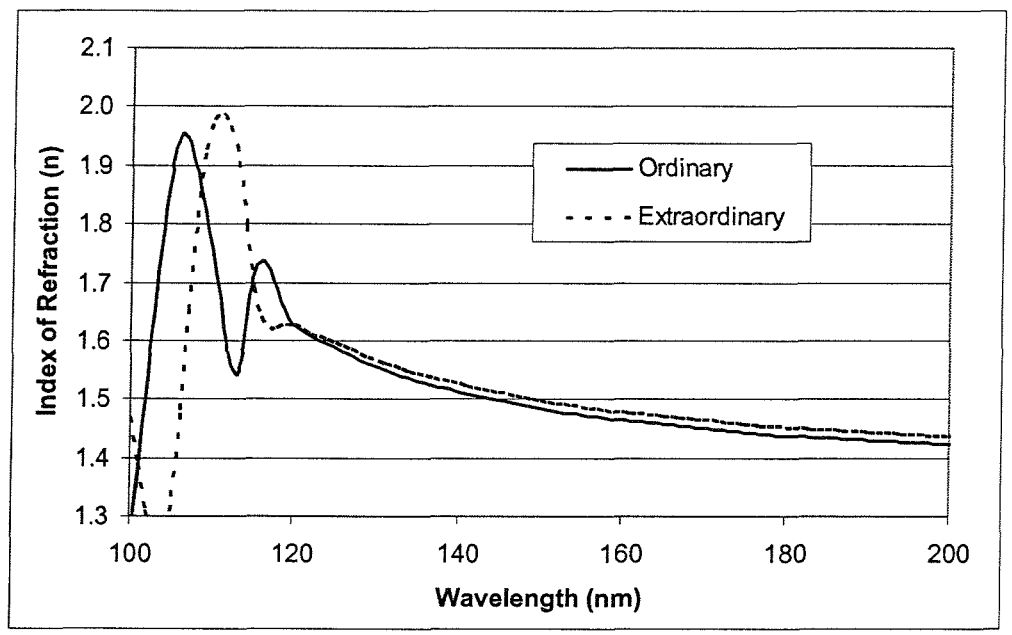
FIG. 5—Ordinary and extraordinary indices of refraction for crystalline $MgF_2$.

The fact that a discrete range of wavelengths of the extraordinary beam passes through the opening in the aperture is a consequence of the optical properties of the MgF$_2$ prism pair. The ordinary and extraordinary indices of refraction for single crystal MgF$_2$ are presented in FIG. 5. As is evident from the figure, the two spectra actually cross one another somewhere in the neighborhood of 120 nm. As a result, the orthogonally polarized components of the input beam effectively experience the same optical properties as they cross the internal prism/prism interface at this unique wavelength. Hence, the extraordinary beam is not deviated and travels through the second prism collinear with its ordinary counterpart. Thus, at this specific wavelength the polarizer effectively experiences a "dead zone" and fails to function.

In practice, the spectral width of this "dead zone" is determined by a number of factors, including but not limited to, the optical properties of the prisms, the cut angle of the prisms, the size of the opening in the aperture, the degree of collimation of the input beam and the properties of the focusing optic.

While other embodiments of the present techniques could incorporate prisms of materials other than MgF$_2$, this crystal is particularly well-suited for the current application, being one of just a few materials exhibiting both transparency and birefringence in the VUV. Other potential candidates include, but are not limited to $CaF_2$, $BaF_2$, and crystalline quartz. In addition to these options, it is conceivable that VUV transparent, non-birefringent materials, like LiF could also be employed by inducing birefringent properties through external perturbation (i.e. via mechanical stress, etc.)

With regards to the embodiment of FIG. 2, it is further noted that the polarizer could also be configured with the prism pair in the reverse geometry. In this case, light would first travel through the prism with its optical axis aligned parallel to its entrance face, and then through the prism with its optical axis aligned perpendicular to its exit face. While the deviation angle of the extraordinary beam is different in this configuration, the net result is similar; the ordinary beam passes through the pair unaltered while the extraordinary beam undergoes a slight, albeit larger, angular deviation.

While many types and/or combinations of focusing optics could be employed in the device, the use of a reflective optic is considered particularly advantageous. Single element lenses inherently introduce chromatic aberrations in optical systems, which can limit their performance and/or usefulness. At longer wavelengths achromatic compound lenses are widely available and can be used to minimize these effects. Unfortunately, aberration-corrected compound optics are not generally available for use in the VUV. Consequently, reflective optical designs, based on mirrors rather than lenses, are more commonly employed.

High quality off-axis toroidal reflectors can now be inexpensively manufactured using replication techniques. When coated with appropriate thin films (e.g. $MgF_2$ coated aluminum) these elements represent attractive options for VUV optical system design. A particularly useful embodiment of the current disclosure incorporates a 90° off-axis parabolic reflector to collect the two beams exiting the prism pair and to focus them onto the spatial aperture.

As previously discussed, the focusing optic focuses the light exiting the prism pair on to the spatial aperture. In the case of the ordinary beam, this results in a well-focused spot, even where polychromatic (i.e. broad band radiation) input light is employed. The situation is considerably more complicated where the extraordinary beam is concerned. For the embodiment of FIG. 2, wherein the focusing optic is an off-axis parabolic reflector, discrete wavelengths of the extraordinary beam will be generally focused along a line or arc on the aperture. Depending on the nature of the focusing optic and its orientation relative to the spatial aperture, the characteristics (i.e. shape, width, etc.) of the focused extraordinary beam region may be expected to vary. In general, however, light from the extraordinary beam will be focused on the aperture such that it is blocked, while the ordinary beam is permitted to pass through the opening in the aperture. While a circular opening in the aperture may be generally preferred, it is acknowledged that other shapes may be employed and in some cases favored.

While the embodiment of FIG. 2 depicts a leak tight enclosure which houses the system elements, it is noted that the enclosure and/or associated ports and manifolds may be redundant in situations where the VUV polarizer is to be integrated into a system which already provides a suitably controlled environment.

The benefits of the proposed VUV polarizer over prior art designs are numerous. Firstly, the optical efficiency of the current invention is much higher than that of prior art systems, as a result of the shorter length of the prism pair utilized. This increased throughput is readily apparent in FIG. 6 which compares the relative efficiencies of a prior art Rochon polarizer (squares) with that of the techniques disclosed herein (triangles). The results have been normalized to the predicted performance of the prior art Rochon polarizer at 400 nm. Clear apertures of 12 mm (diameter) were assumed in both cases. The efficiencies of the two devices are essentially identical at longer wavelength, where the $MgF_2$ is transparent. Below 180 nm however, where the $MgF_2$ becomes absorbing, the current invention exhibits clear improvements.

Another benefit of the embodiments described herein relates to their scalability. As previously discussed, standard Rochon polarizers employ cut angles of ~80°. While these devices are available in a variety of sizes, they are rarely offered with clear apertures larger than about 12 mm. This limitation is a direct consequence of the absorption losses resulting from the long path length, inherently associated with the large cut angle geometry. In striking contrast, the polarizer of the described herein utilizes a cut angle of just 30°, resulting in a clear aperture that can be freely increased without incurring significant absorption losses.

Figure 6:
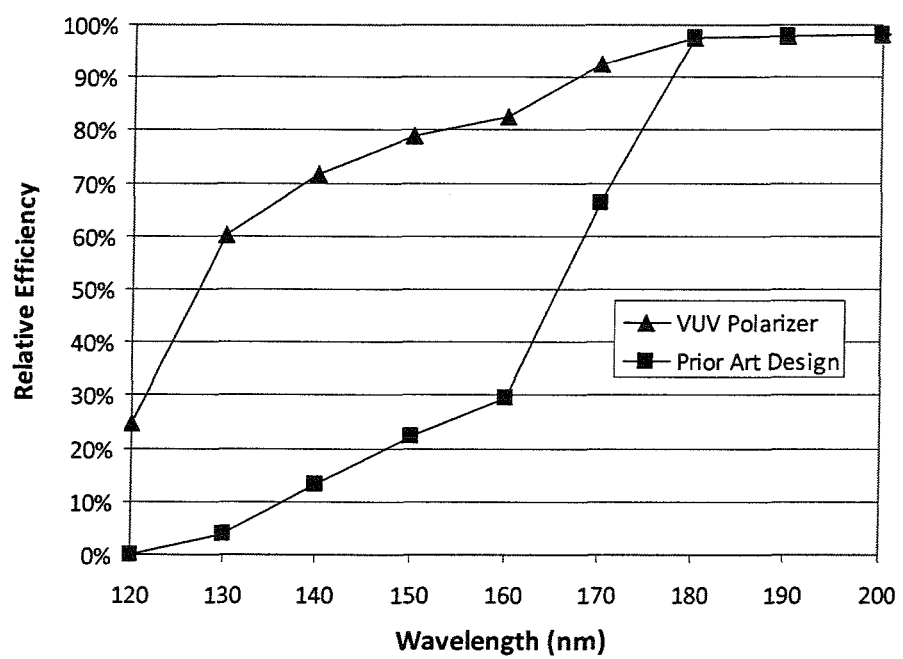
FIG. 6—Performance comparison for polarizers with 12 mm clear apertures. Results for both prior art design (squares) and novel VUV polarizers (triangles) are provided.
Figure 7:
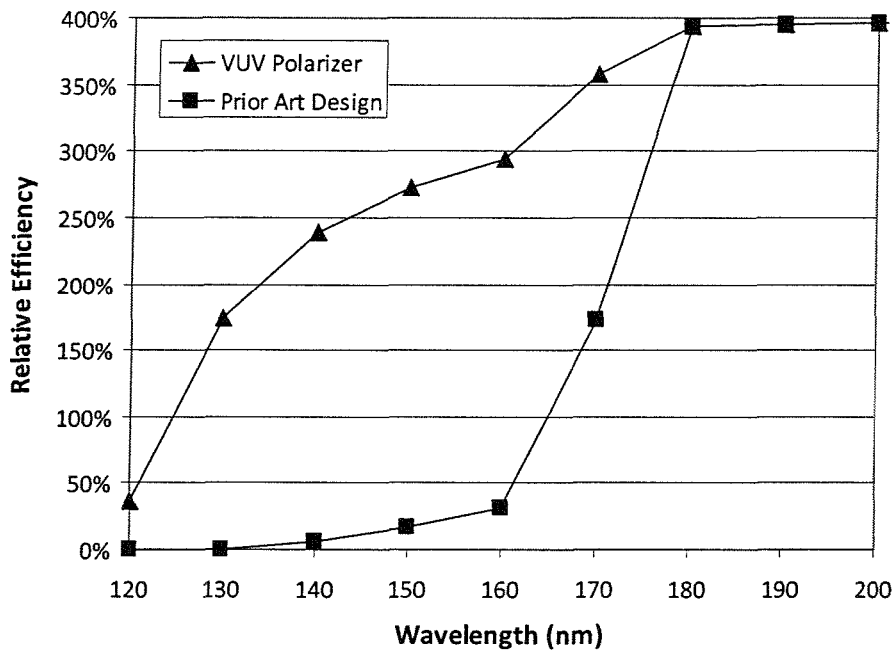
FIG. 7—Performance comparison for polarizers with 24 mm clear apertures. Results for both prior art design (squares) and novel VUV polarizers (triangles) are provided.

The advantages of the scalability of the current invention are illustrated in FIG. 7 which compares the relative efficiencies of prisms twice the size of those considered in FIG. 6. Hence, the simulations of FIG. 7 correspond to prior art (squares) and the novel disclosed (triangles) polarizers with 24 mm clear apertures. For comparative purposes the results are again normalized to the expected performance of the 12 mm clear aperture prior art polarizer at 400 nm.

As would be expected, doubling the clear aperture results in a 4-fold increase in optical throughput at longer wavelengths for both devices. This follows as the throughput is expected to scale with area, at least at those wavelengths where absorption is absent. At shorter wavelengths, where the $MgF_2$ becomes absorbing, the situation is quite different. Below 160 nm the prior art polarizer with 24 mm clear aperture is actually less efficient than its 12 mm counterpart in FIG. 6 This drop in performance is a consequence of the increased length of the prism pair in the larger device. Hence, the losses due to absorption increase faster than the gains resulting from the larger aperture as the device is scaled up. In contrast, the optical throughput in the 24 mm version of the current invention polarizer increases across the entire range of wavelengths (at least from 120 nm-200 nm), relative to its smaller 12 mm counterpart.

Figure 8:
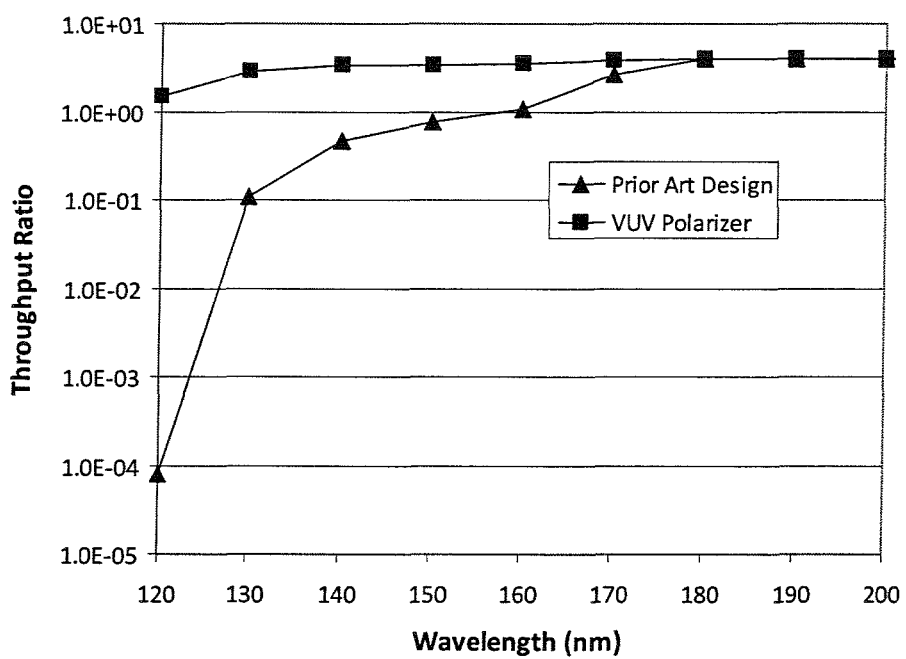
FIG. 8—Ratio of the optical throughput of 24 mm and 12 mm versions of prior art (triangles) and current invention (squares) polarizers.

This difference is exemplified in FIG. 8 which presents the ratio of the optical throughput of 24 mm and 12 mm versions of prior art (triangles) and the novel VUV (squares) polarizers. As is evident in the figure, doubling the size of a prior art polarizer provides greater throughput at longer wavelengths, but results in a net loss at wavelengths below 160 nm. In contrast, increasing the size (i.e. clear aperture) of the current polarizer, results in a net increase in throughput for all wavelengths shown. Hence, over the wavelength range investigated, the novel polarizer is infinitely scalable, while the prior art design suffers from clear aperture restrictions. That is, the optical throughput of the current invention continues to increase across all wavelengths as the clear aperture of the device is increased, while that of the prior art design does not.

Figure 9:
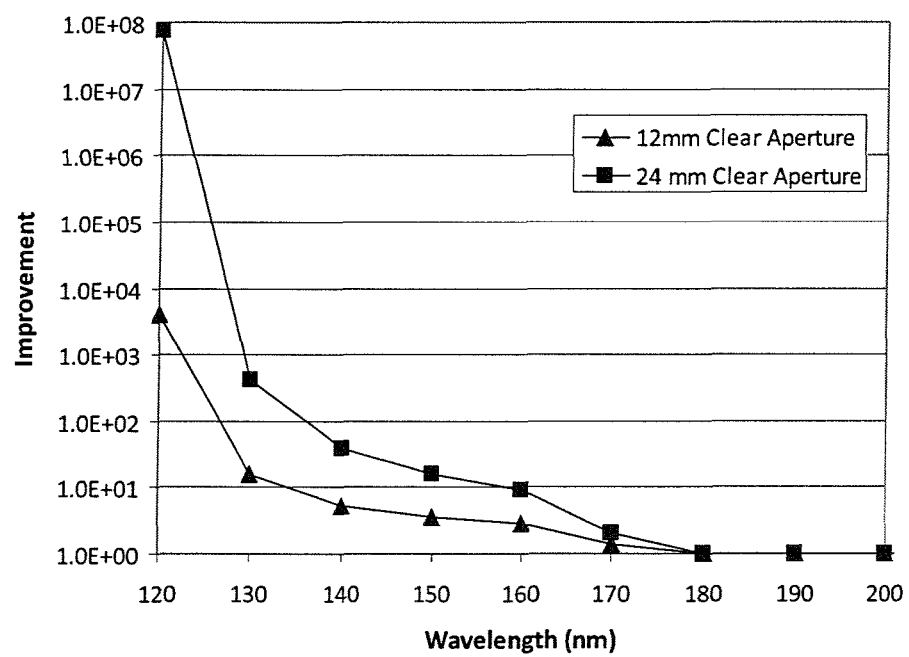
FIG. 9—Throughput enhancement of novel VUV polarizer relative to prior art design for polarizers with 12 mm (triangles) and 24 m (squares) clear apertures.

The advantages of the embodiments disclosed herein with regards to optical throughput represent a tremendous improvement over prior art designs. The extent of this improvement is quickly evident upon examination of the results of FIG. 9, which presents the ratio of the optical throughput of the current disclosed polarizer to that of the prior art design. Results are provided for both 12 mm (triangles) and 24 mm (squares) versions. As can be seen the current invention polarizer is dramatically more efficient than the prior art design. As is evident, the ratio varies from as low as unity at long wavelengths, to as large as 3 or 8 orders of magnitude at 120 nm for the 12 mm and 24 mm versions, respectively.

A further benefit of the embodiments disclosed herein relate to their compact nature. As previously discussed, prior art Rochon polarizers require that the orthogonally polarized beams exiting the prism pair travel considerable distances to achieve separation. In contrast the current VUV polarizer, with its focusing optic and spatial aperture, achieves the same end in a significantly shorter distance. While path length, or perhaps more appropriately footprint is an important consideration in the design of any device, it is particularly significant where VUV wavelengths are concerned. Common gases like moisture and oxygen absorb strongly in the VUV so great care must be taken to reduce and/or altogether remove such species from the optical path of VUV instruments. As a result, the compact nature of the current invention polarizer is particularly advantageous since the requirements of its controlled environment are considerably lessened, relative to longer path length prior art designs.

Yet another benefit of the current technique relates to its stability. As noted earlier, optically contacted surfaces have been known to delaminate following exposure to high power radiation. Standard Rochon polarizers cannot operate with an air gap (as a result of the large cut angles employed), while custom high power versions equipped with air gaps require highly collimated laser sources, suffer from large footprint requirements, and lack the controlled environment necessary for VUV operation. Hence, the current technique is unique in its ability to generate linearly polarized light from a wide variety of VUV sources. As the cut angle of the prisms employed in the current embodiments are relatively small (~30°), the device may be configured with an air gap for high power use is desired. The focusing optic and spatial aperture enable less collimated (i.e. non-laser) sources to be separated, while maintaining a small footprint within the leak tight enclosure.

Figure 10:
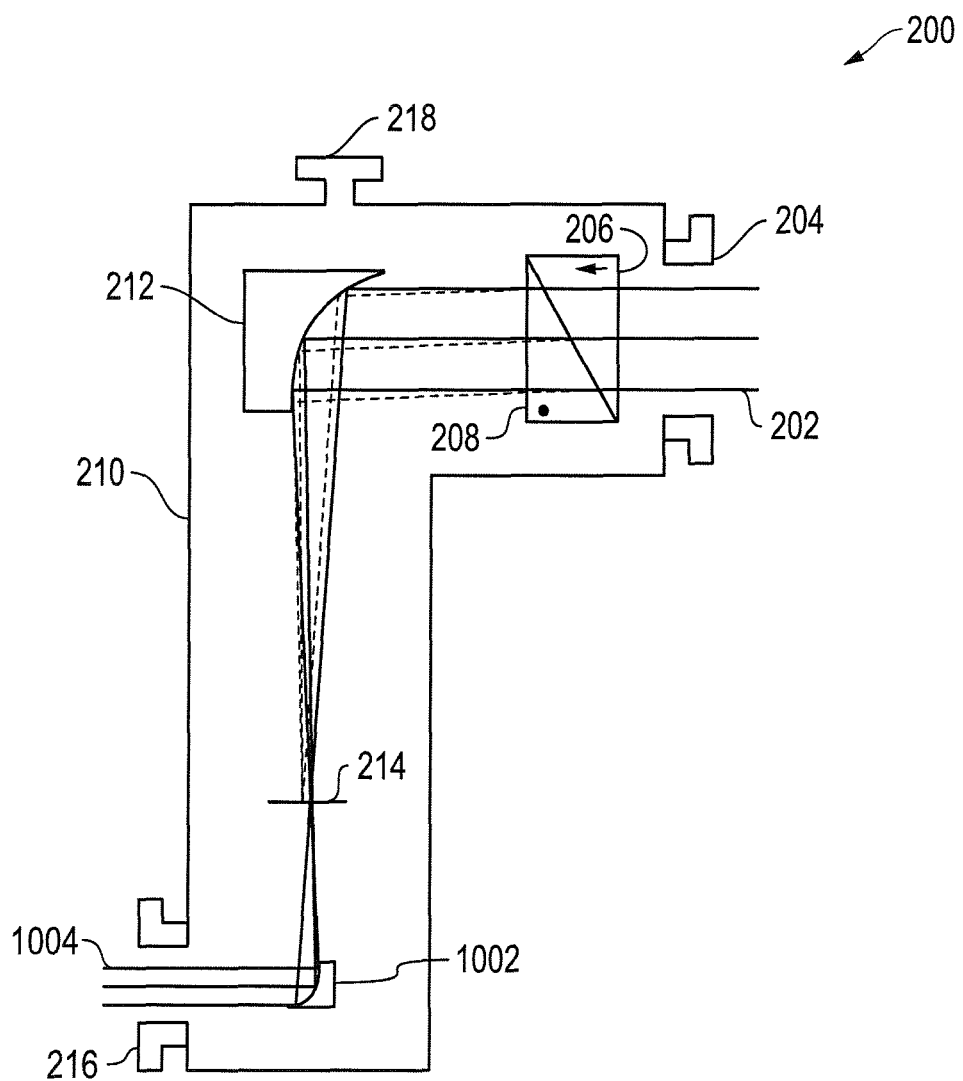
FIG. 10—Schematic representation of novel VUV polarizer equipped with collimating exit optic.

FIG. 10 presents another embodiment of the current techniques employing a subsequent optical element 1002 after the spatial aperture 214. The purpose of this element 1002 is to collect and collimate the light passing through the aperture in order to provide a collimated linearly polarized output beam 1004. This embodiment provides for easy integration into optical instrumentation since both the input and output beams are collimated.

While clearly of great benefit for use in polarizer applications, the current techniques can also be used as a polarization analyzer when equipped with a rotary stage and appropriate detector. An embodiment of such a device is presented in FIG. 11. In operation, collimated light enters the device through the entrance port and impinges on the front face of the prism pair (206 and 208). The ordinary beam passes through the pair unaltered, while the extraordinary beam undergoes a slight angular deviation at the interface between the two prisms. The prism pair is mounted on a stage 1102 capable of rotating about the optical axis of the prism pair. The rotary stage connects with an appropriate controller and computer 1104 via a vacuum compatible cable assembly. The ordinary beam is unaffected by rotation of the prism pair, while the extraordinary beam sweeps out a circular exit pattern when the stage is rotated.

Both of the orthogonally polarized beams exit the prism pair and reflect from the focusing optic. The ordinary beam is focused to a well defined spot centered over the opening in the spatial aperture, while the extraordinary beam is less ideally focused elsewhere on the solid portion of the aperture. The extraordinary beam is thus blocked, while the ordinary beam passes through and carries on into the spectroscopic detection system 1106.

Light passing through the spatial aperture then encounters a wavelength dispersive or diffractive element 1108, in this case an aberration-corrected flat-field imaging grating. Light incident on the grating is diffracted and focused such that discrete wavelengths are spatially resolved on the surface of a VUV-sensitive detector element 1110. Preferably, the detector element may be an array detector. The detector element is coupled to associated control electronics and a computer through use of another vacuum compatible cable assembly. The entirety of the polarization analyzer resides within a leak tight housing so as to facilitate creation of a suitable controlled environment. While not explicitly shown, the device is equipped with necessary baffles so as to minimize stray light effects.

When employed in this manner the current invention represents a particularly efficient polarization-sensitive VUV spectrometer, since several requisite elements are shared. Namely, the spatial aperture and focusing element of the polarizer act as the entrance aperture and light coupling optic for the spectrometer.

Figure 11:
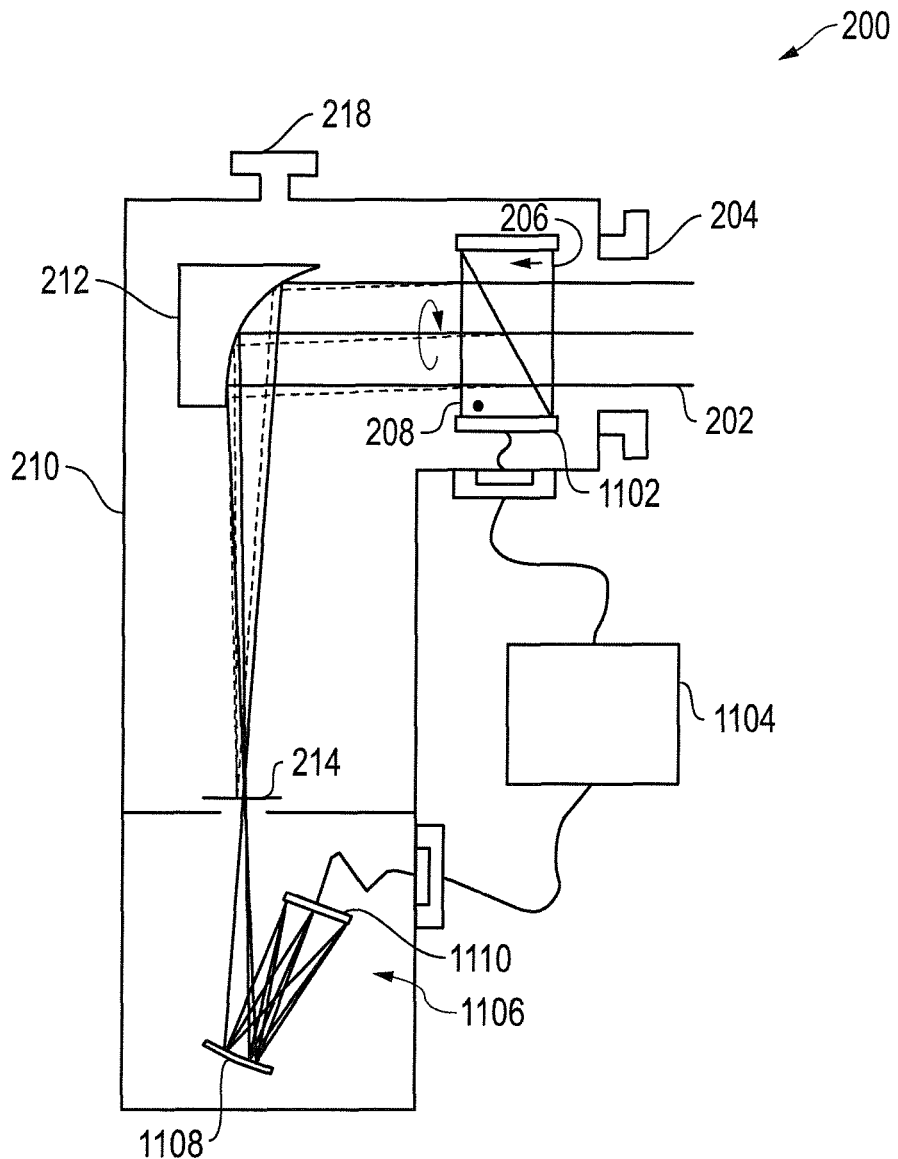
FIG. 11—Novel VUV polarization analyzer with rotating prism pair and spectroscopic detection system.

In yet another preferred embodiment, the apparatus of FIG. 11 could also be utilized without the rotary stage, such that light entering the spectroscopic detector does so with a fixed polarization state. This may be beneficial in systems where concerns exist regarding the polarization dependence of the detection system.

While valuable in virtually any application and/or system requiring the creation or analysis of linearly polarized light in the VUV, the current techniques should prove particular advantageous when integrated into optical instruments including, but not limited to, reflectometers, ellipsometers, polarimeters, and circular dichroism spectrometers.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements may be substituted for those illustrated and describe herein and certain features of the invention may be utilized independently of the use of other features, all as would be apparent to one skilled in the art after having the benefit of this description of the invention.

What is claimed is:

1. A polarization device for use in the VUV or shorter wavelength region comprising:
   a dispersive element capable of splitting an incident unpolarized beam of VUV or shorter wavelength light into two VUV or shorter wavelength beams having orthogonal linear polarization through introduction of an angular deviation, the two beams being a first linearly polarized beam and a second linearly polarized beam;
   a focusing element capable of focusing at least a portion of the first linearly polarized beam to a first region; and
   a spatial aperture which allows at least most of the first linearly polarized beam to pass and which blocks at least most of the second linearly polarized beam.

2. The device of claim 1, the dispersive element being rotatable.

3. The device of claim 2, the dispersive element being rotatable about an optical axis of the dispersive element.

4. The device of claim 2, a plane of polarization of the first linearly polarized beam being rotatable.

5. The device of claim 1, a plane of polarization of the first linearly polarized beam being rotatable.

6. The device of claim 5, a plane of polarization of the first linearly polarized beam being rotatable without movement of the spatial aperture or the focusing element.

7. The device of claim 1, the dispersive element being comprised of two or more prisms.

8. The device of claim 1, the dispersive element being comprised of at least a first prism and a second prism, a first prism optical axis being aligned perpendicular to a first prism entrance face and a second prism optical axis being aligned parallel to a second prism exit face.

9. The device of claim 1, further comprising an enclosed volume configured to surround at least the dispersive element, focusing element and the spatial aperture, the enclosed volume providing a controlled environment so as to reduce absorption losses of beams transmitted within the enclosed volume.

10. The device of claim 1, further comprising a wavelength dispersive or diffractive element configured to accept beams which pass through the spatial aperture.

11. The device of claim 10, further comprising an array detector which receives spatially resolved wavelengths of light from the wavelength dispersive or diffractive element.

12. The device of claim 11, further comprising an enclosed volume configured to surround at least the dispersive element, the focusing element, the spatial aperture, the wavelength dispersive or diffractive element, and the array detector, the enclosed volume providing a controlled environment so as to reduce absorption losses of beams transmitted within the enclosed volume.

13. The device of claim 1, further comprising a collimating element which collimates light passing through the spatial aperture to provide a collimated output beam.

14. A polarization device for use in the VUV or shorter wavelength region comprising:
 a first optical element, the first optical element receiving a VUV or shorter wavelength un-polarized beam of light as an input and providing as an output at least a first polarized light beam and a second polarized light beam, the first and second polarized light beams having orthogonal linear polarizations; and
 a focusing element provided in a path to receive at least the first polarized light beams, the focusing element focusing at least the first polarized light beam in a manner that is spatially separate and distinct from the second polarized light beam,
wherein the first optical element is rotatable so as to provide rotation of a plane of polarization of the focused first polarized light beam.

15. The polarization device of claim 14, further comprising a spatial aperture for blocking at least a portion of the second polarized light beam.

16. A method of polarizing light of VUV or shorter wavelengths, comprising:
 providing an un-polarized light beam of VUV or shorter wavelength light;
 creating from the un-polarized beam a first light beam of VUV or shorter wavelength and a second light beam of VUV or shorter wavelength, the first light beam and second light beam having orthogonal linear polarization;
 focusing at least a portion of the first linearly polarized beam to a first region, the first light beam and the second light beam being spatially separated at the first region; and
 passing at least a portion of the first light beam through a spatial aperture after the focusing, the spatial aperture blocking at least a portion of the second light beam.

17. The method of claim 16, further comprising rotating a plane of polarization of the first light beam.

18. The method of claim 16, further comprising collimating the at least a portion of the first light beam that passes through the spatial aperture.

19. The method of claim 16, further comprising spatially resolving discrete wavelengths of the first light beam upon a detector after the first light beam passes through the spatial aperture.

20. The method of claim 19, further comprising rotating a plane of polarization of the first light beam.

* * * * *